Figure 1:
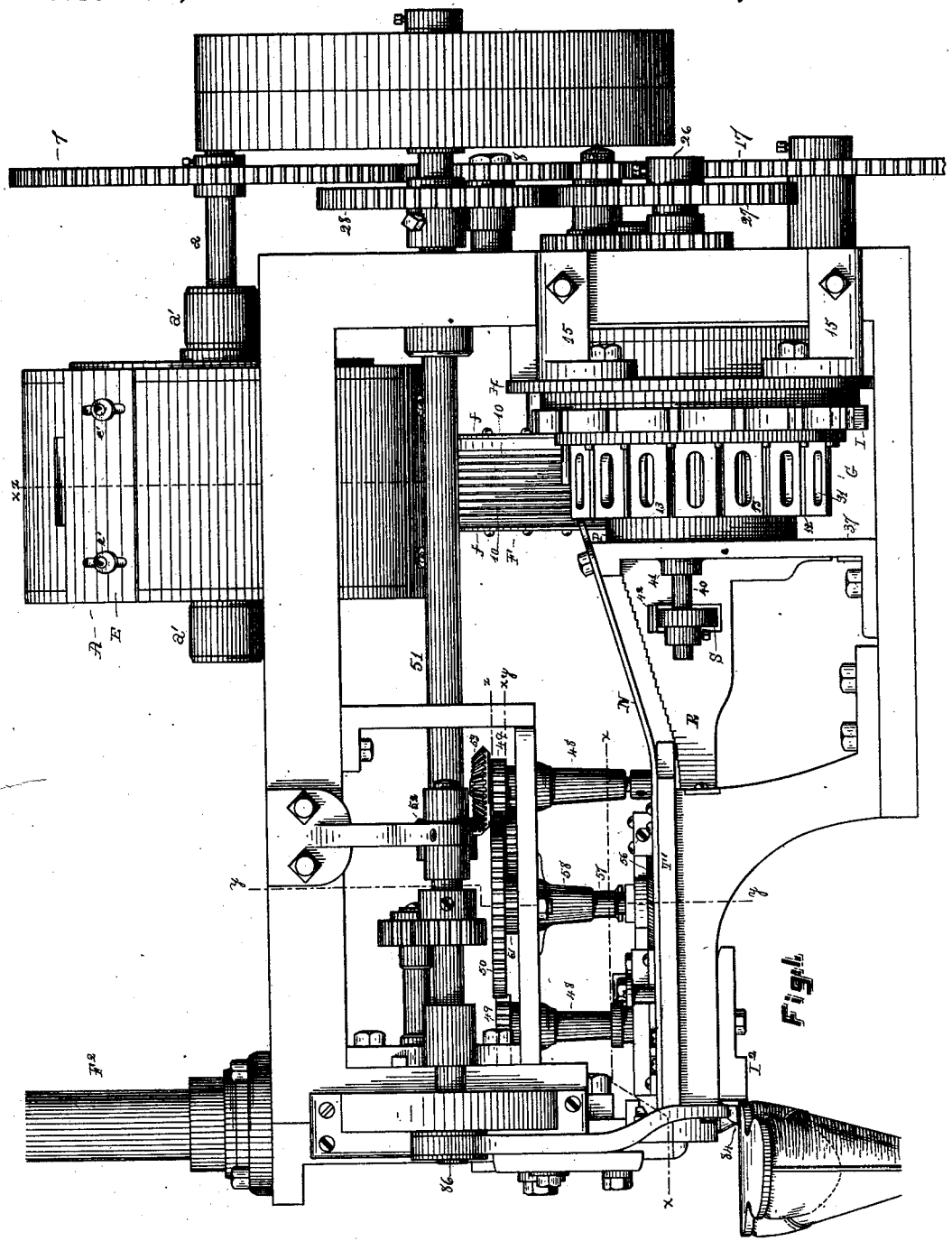

(No Model.)

13 Sheets—Sheet 1.

S. SHEPHERD.
Nailing Machine.

No. 242,061.　　　　　　　Patented May 24, 1881.

Witnesses:
E. C. Perkins
L. L. Tilden

Inventor,
Samuel Shepherd
By C. B. Tilden
Attorney.

N. PETERS, Photo-Lithographer, Washington, D. C.

(No Model.)
13 Sheets—Sheet 3.

S. SHEPHERD.
Nailing Machine.

No. 242,061. Patented May 24, 1881.

Witnesses,
C. C. Perkins
L. L. Tilden

Inventor,
Samuel Shepherd,
By C. B. Tilden
Attorney.

(No Model.) 13 Sheets—Sheet 4.

S. SHEPHERD.
Nailing Machine.

No. 242,061. Patented May 24, 1881.

Witnesses:
C. C. Perkins
L. L. Tilden

Inventor:
Samuel Shepherd,
By C. B. Tilden
Attorney.

(No Model.)

S. SHEPHERD.
Nailing Machine.

No. 242,061.

13 Sheets—Sheet 5.

Patented May 24, 1881.

Witnesses,
S. C. Perkins
L. L. Tilden

Inventor,
Samuel Shepherd,
By C. B. Tilden
Attorney.

N. PETERS. Photo-Lithographer, Washington, D. C.

(No Model.) 13 Sheets—Sheet 6.

S. SHEPHERD.
Nailing Machine.

No. 242,061. Patented May 24, 1881.

Witnesses:
C. C. Perkins
L. L. Tilden

Inventor:
Samuel Shepherd,
By C. B. Tilden
Attorney.

(No Model.) 13 Sheets—Sheet 7.
S. SHEPHERD.
Nailing Machine.
No. 242,061. Patented May 24, 1881.

Witnesses:
C. C. Perkins
L. L. Tilden

Inventor:
Samuel Shepherd
By C. B. Tilden
Attorney.

(No Model.) 13 Sheets—Sheet 8.

S. SHEPHERD.
Nailing Machine.

No. 242,061. Patented May 24, 1881.

Witnesses,
C. C. Perkins
L. S. Tilden

Inventor,
Samuel Shepherd
By C. B. Tilden
Attorney.

(No Model.)  13 Sheets—Sheet 9.

S. SHEPHERD.
Nailing Machine.

No. 242,061.  Patented May 24, 1881.

Witnesses:
C. C. Perkins
L. L. Tilden

Inventor:
Samuel Shepherd,
By C. B. Tilden
Attorney.

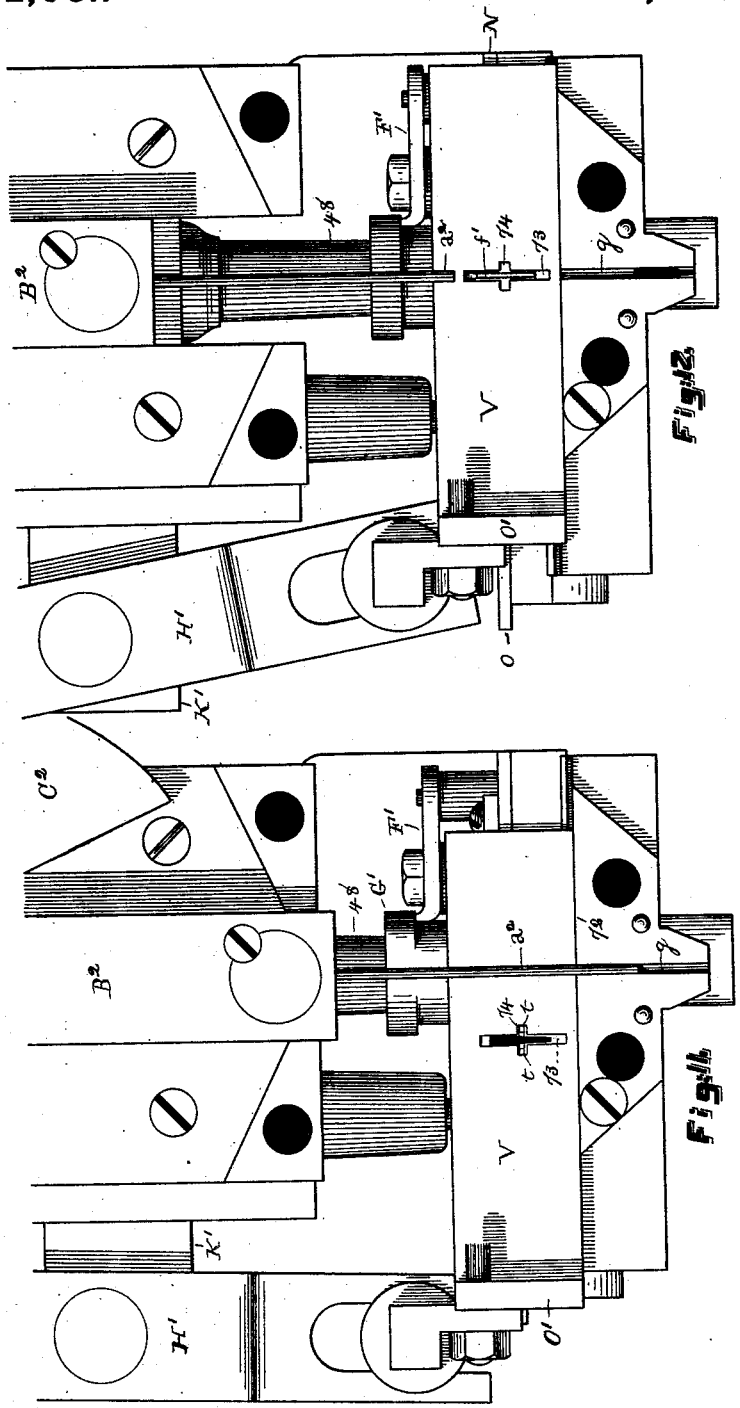

(No Model.)  
13 Sheets—Sheet 11.
S. SHEPHERD.
Nailing Machine.
No. 242,061. Patented May 24, 1881.
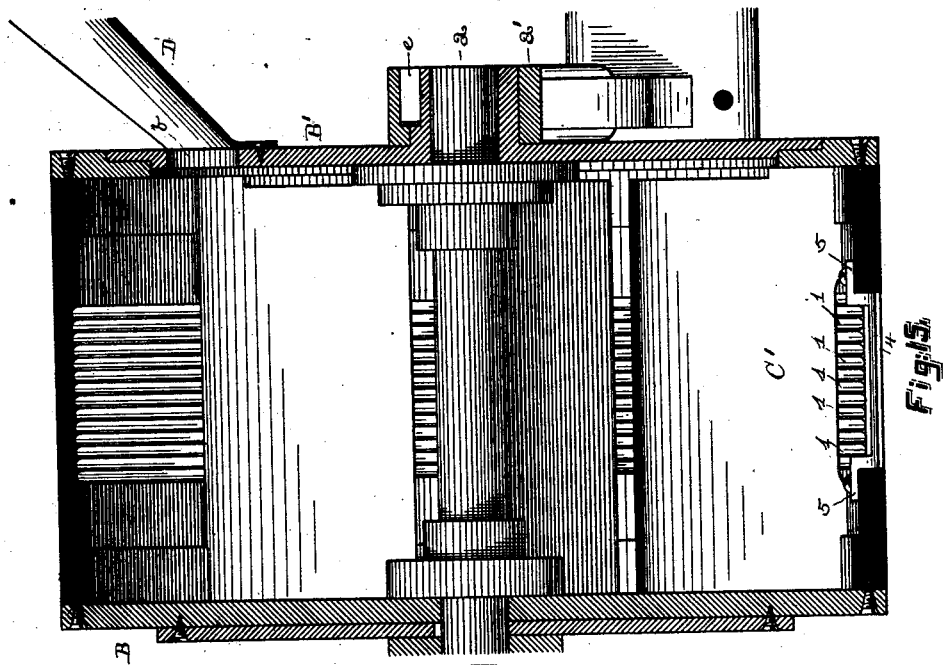
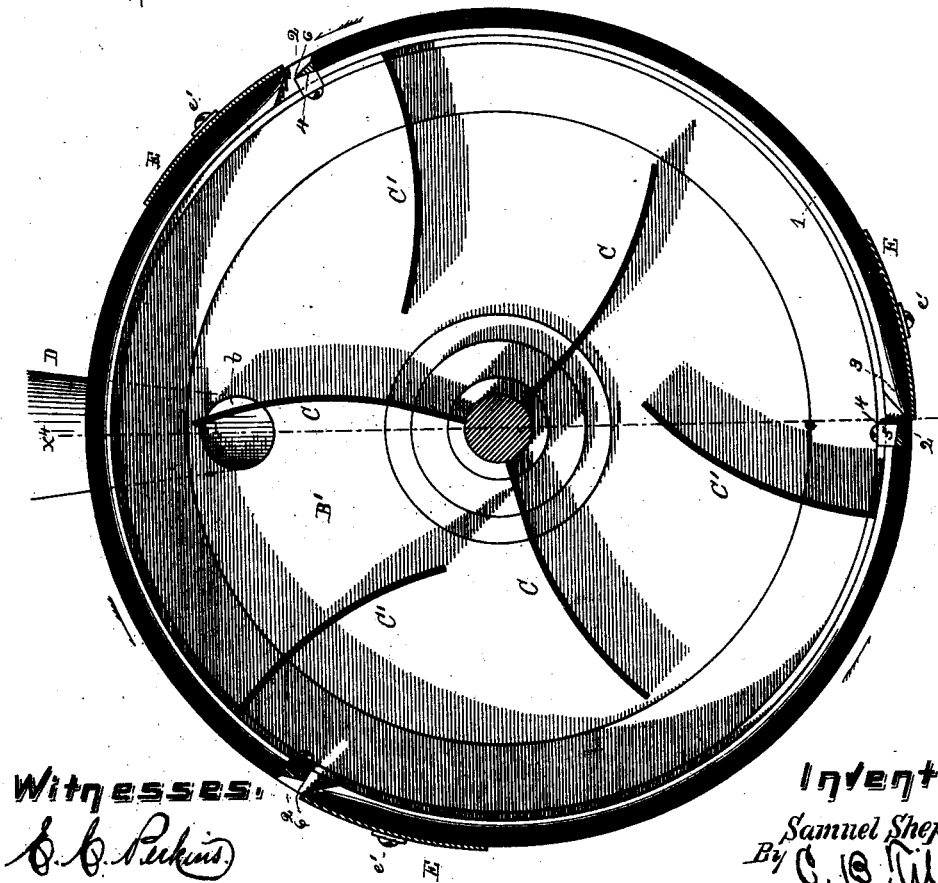
Witnesses:
S. C. Perkins
L. L. Tilden
Inventor:
Samuel Shepherd
By C. B. Tilden
Attorney.

(No Model.) 13 Sheets—Sheet 12.

S. SHEPHERD.
Nailing Machine.

No. 242,061. Patented May 24, 1881.

Witnesses:
E. C. Perkins
L. L. Tilden

Inventor:
Samuel Shepherd.
By C. B. Tilden
Attorney.

(No Model.)  13 Sheets—Sheet 13.
S. SHEPHERD.
Nailing Machine.
No. 242,061.  Patented May 24, 1881.
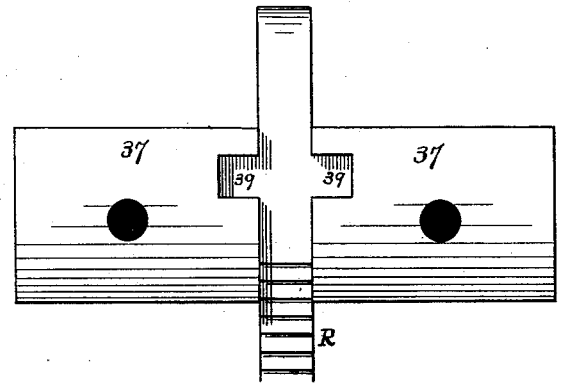
Fig.19.
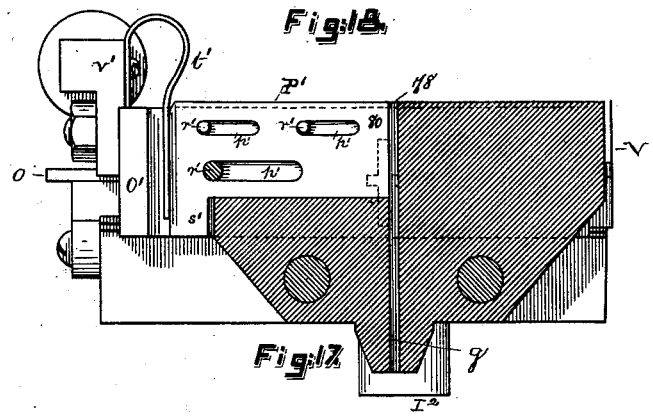
Fig.18.
Fig.17.
Witnesses:
E. A. Perkins.
L. L. Tilden.
Inventor:
Samuel Shepherd,
By C. B. Tilden
Attorney.
N. PETERS, Photo-Lithographer, Washington, D. C.

UNITED STATES PATENT OFFICE.

SAMUEL SHEPHERD, OF NASHUA, NEW HAMPSHIRE.

NAILING-MACHINE.

SPECIFICATION forming part of Letters Patent No. 242,061, dated May 24, 1881.

Application filed January 15, 1881. (No model.)

*To all whom it may concern:*

Be it known that I, SAMUEL SHEPHERD, of Nashua, in the county of Hillsborough and State of New Hampshire, have invented certain new and useful Improvements in Machines for Driving Headless Nails, of which the following is a specification.

The object of my invention is to provide automatic mechanism for forming or setting up a string of the headless nails used in nailing boots and shoes, for feeding said string toward the driving mechanism, and for separating the individual nails and driving them successively.

Figure 2:
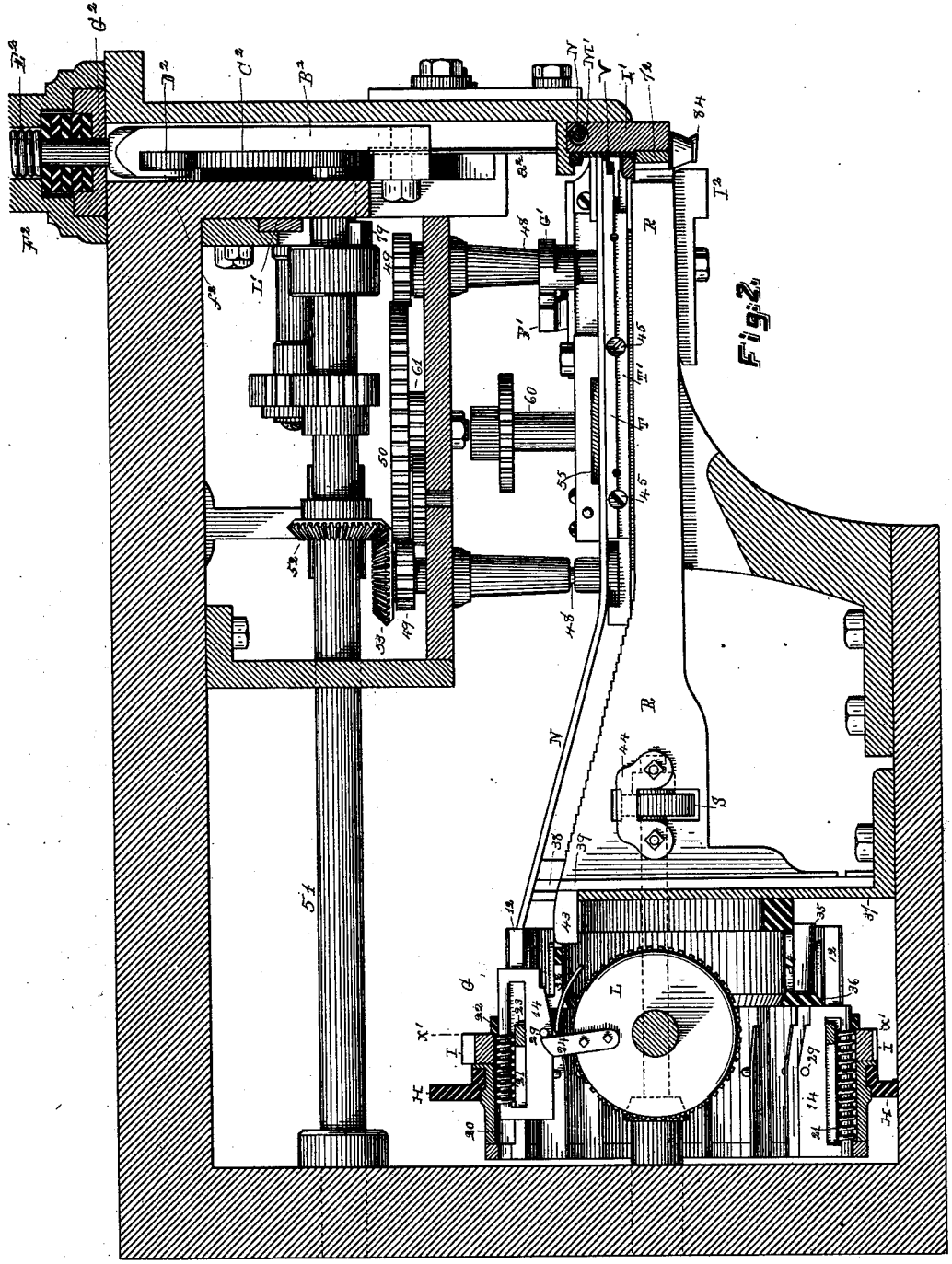
Figure 3:
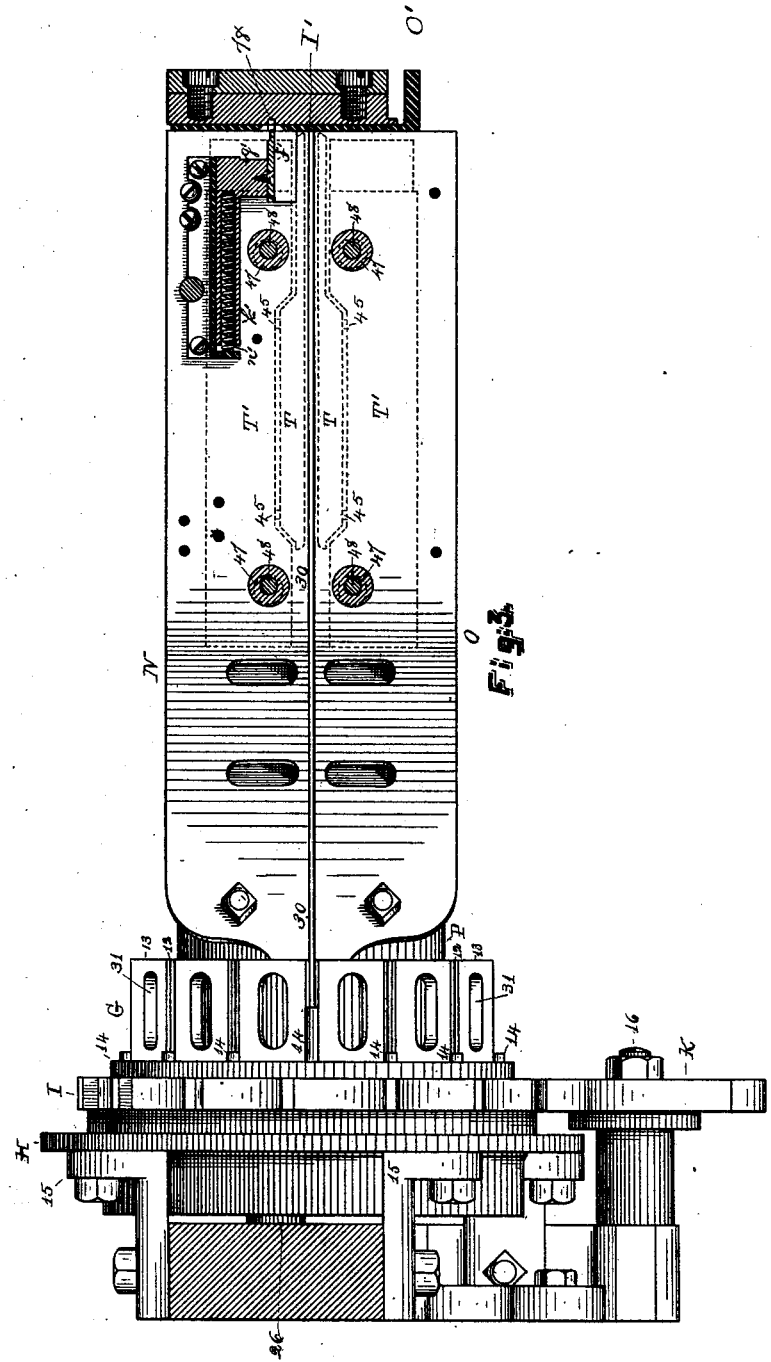
Figure 4:
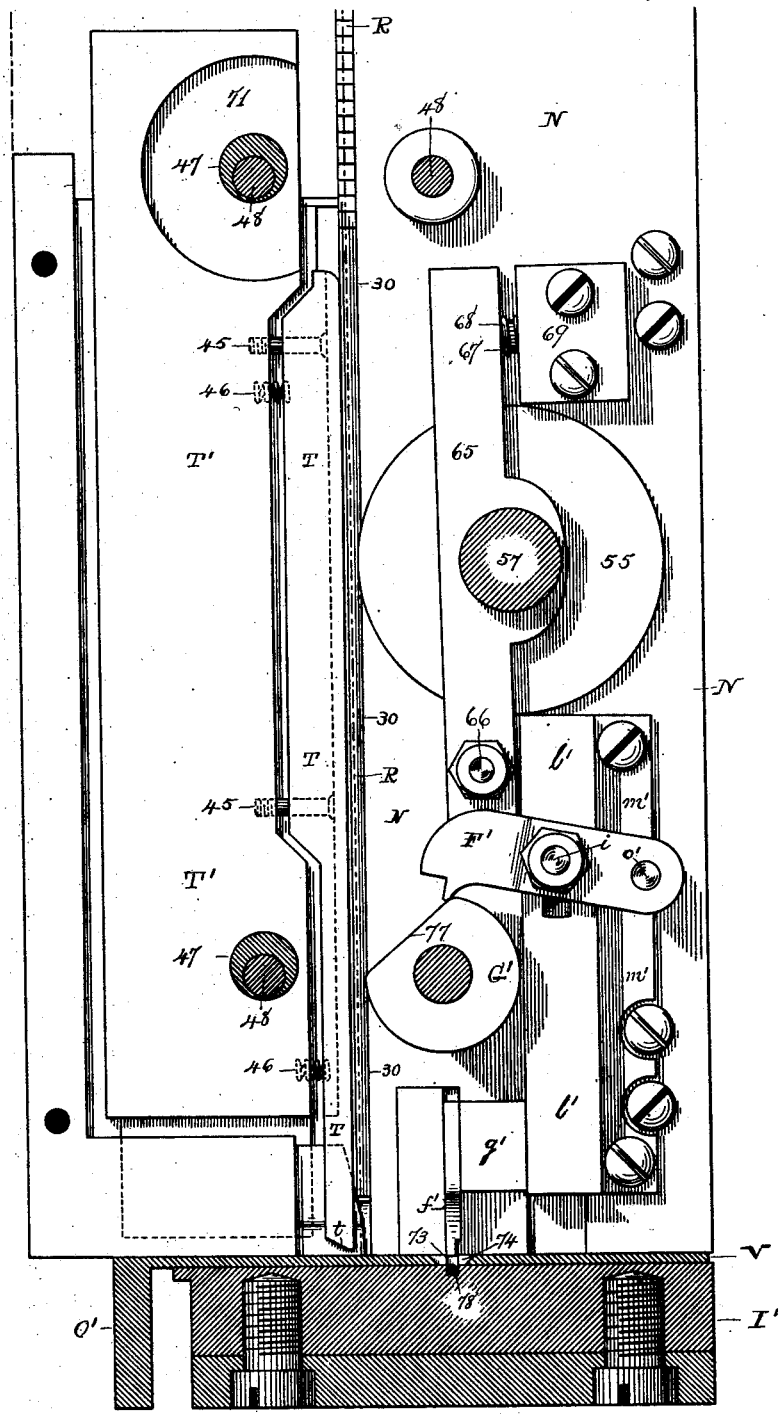
Figure 5:
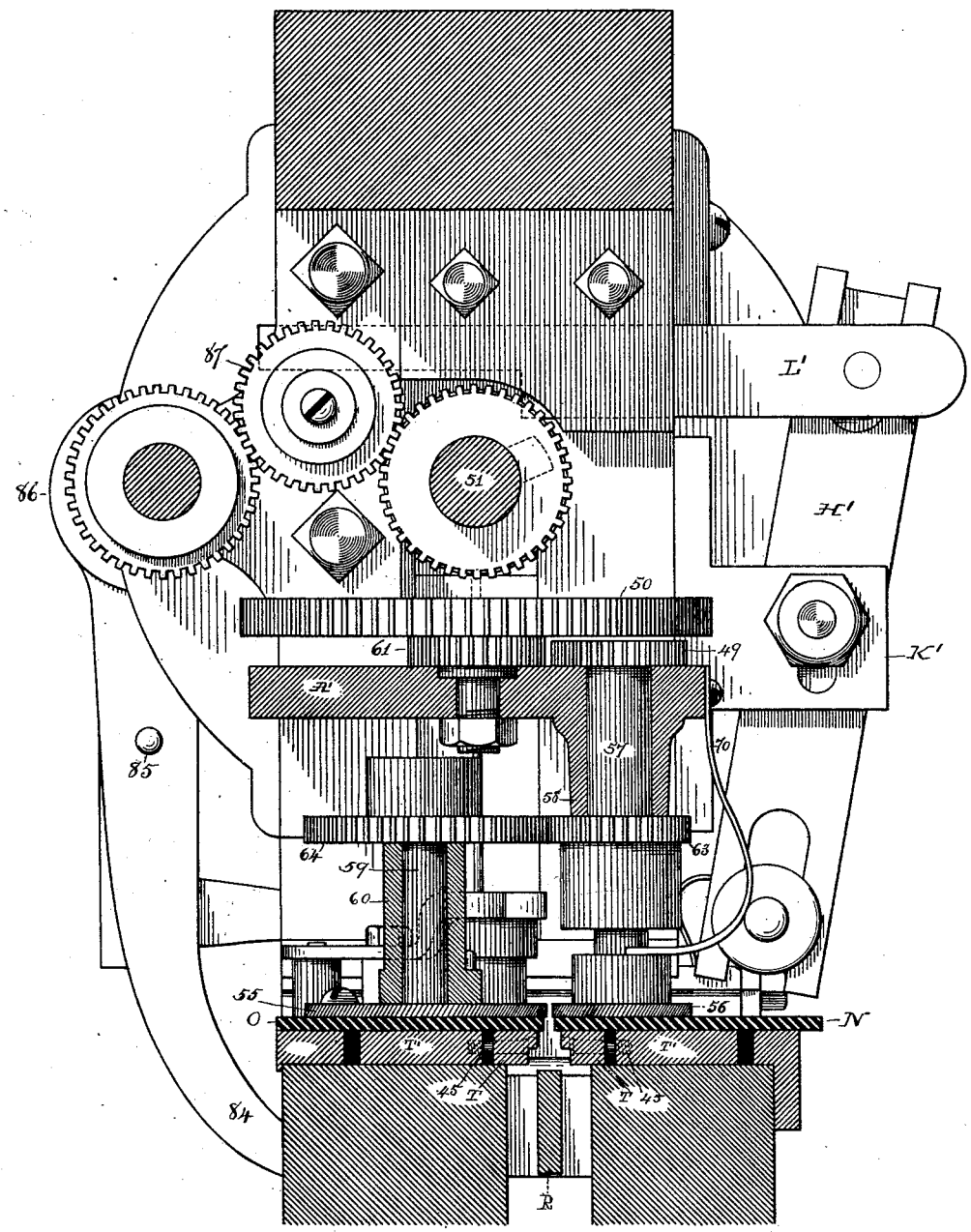
Figure 6:
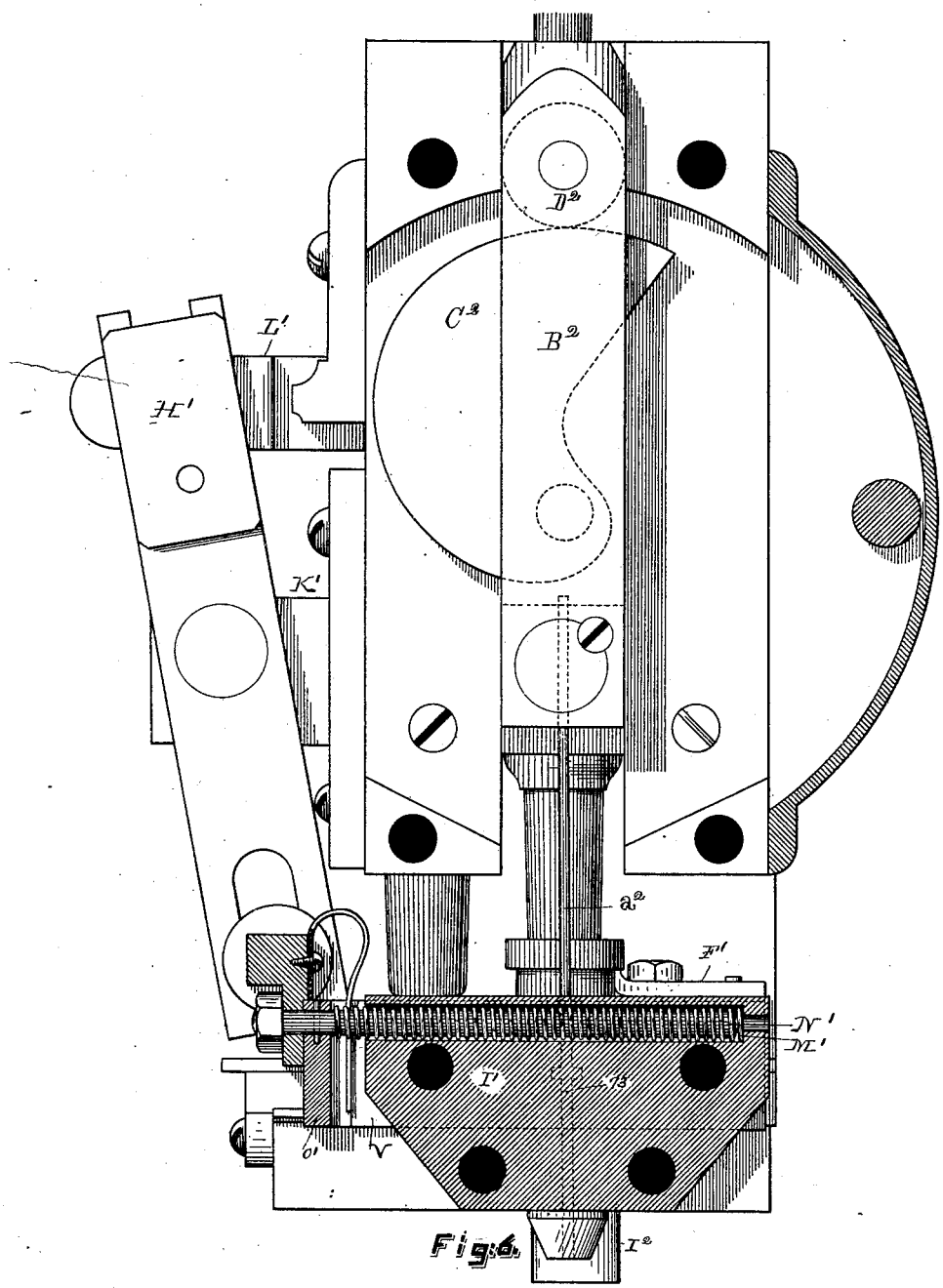
Figure 7:
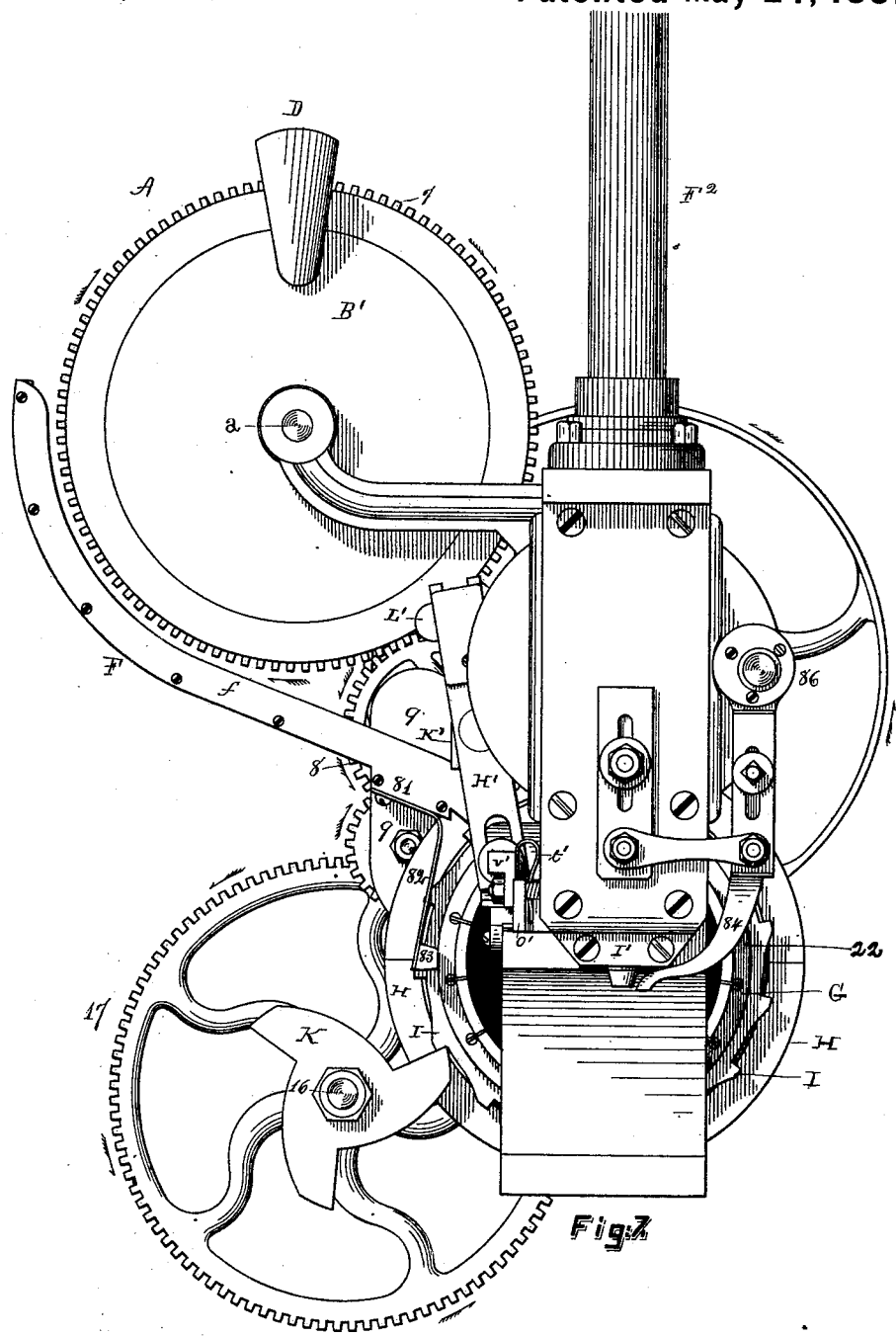
Figure 8:
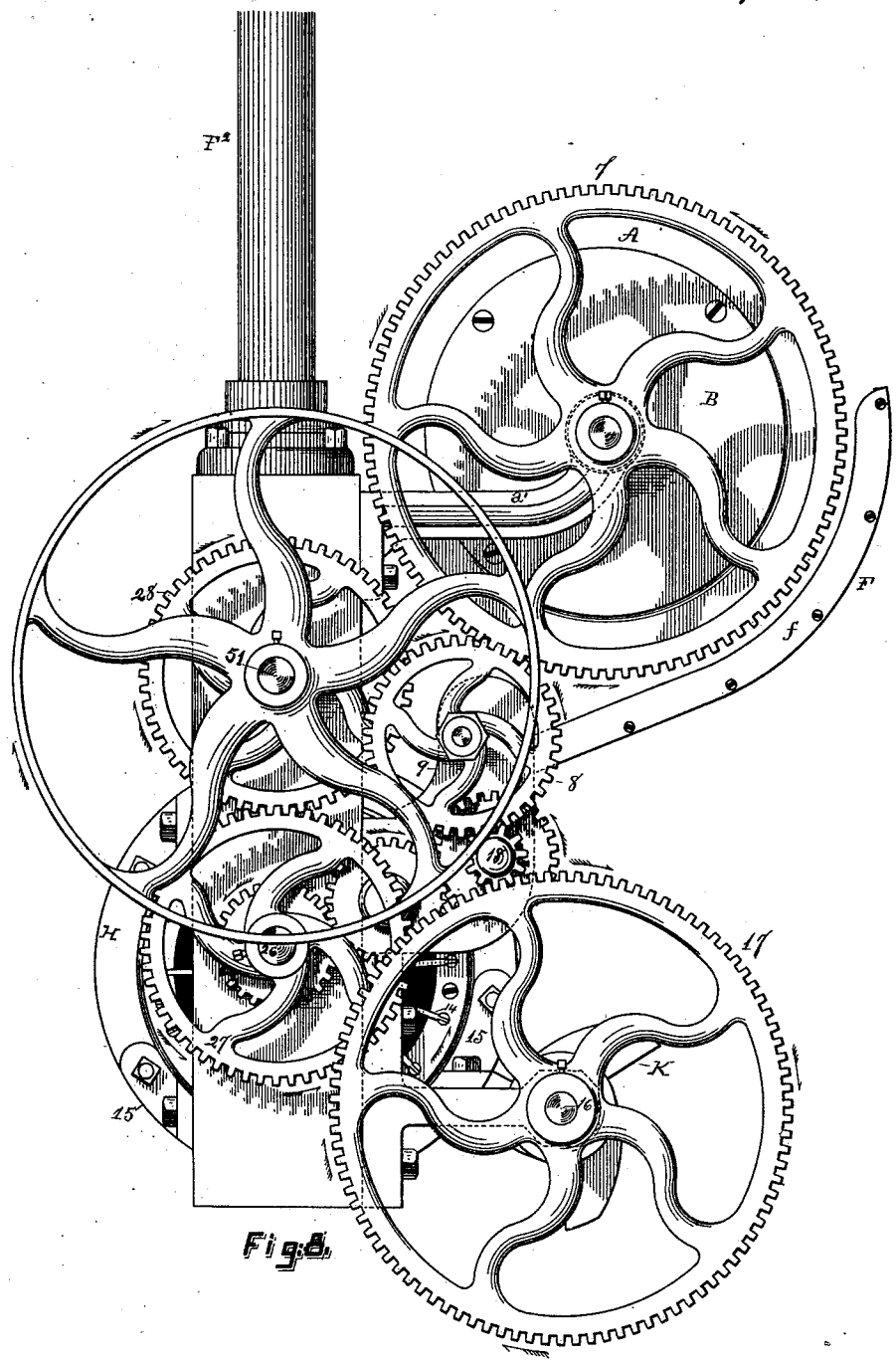
Figure 13:
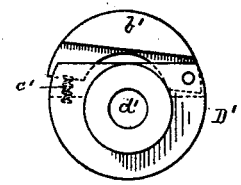
Figure 10:
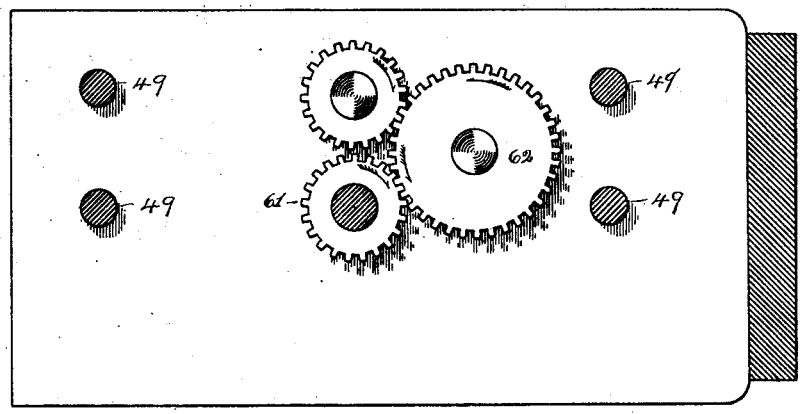
Figure 8:
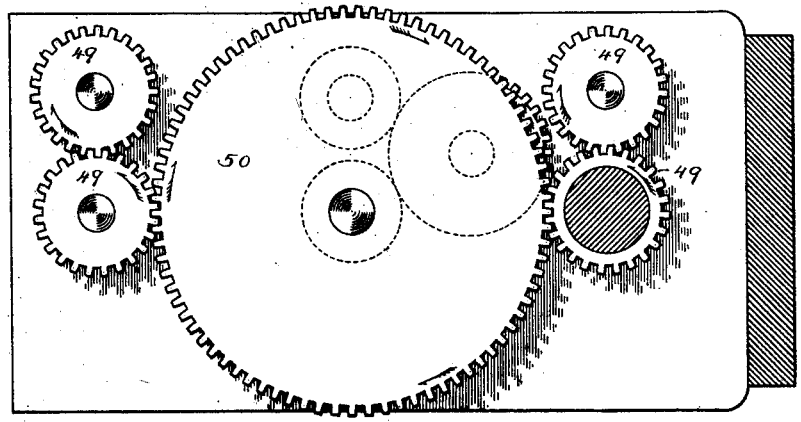
Figure 16:
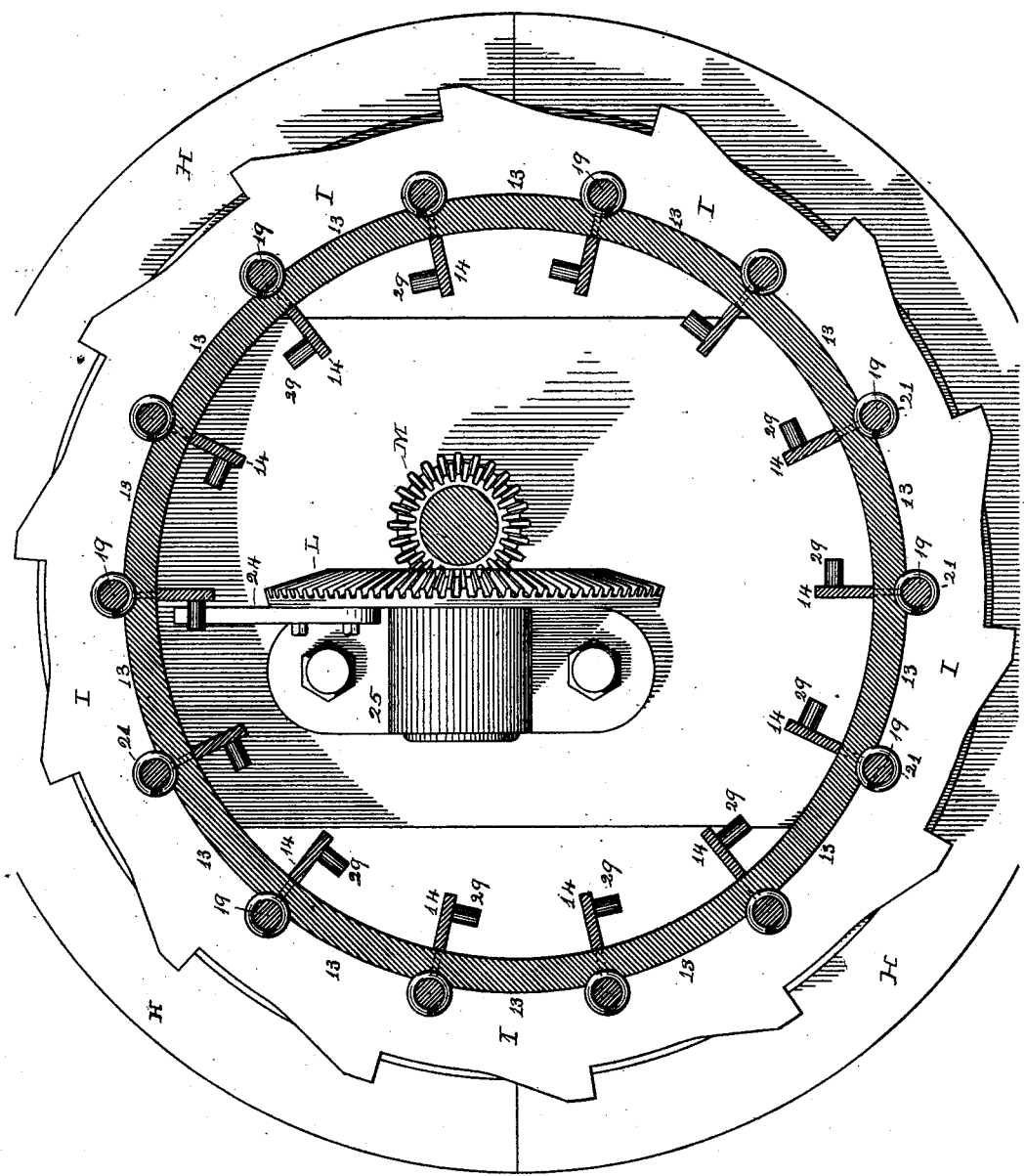

Referring to the drawings which form part of this application, Figure 1 is a side elevation of the complete machine, with the exception of the upper portion of the case containing the spring which actuates the driver. Fig. 2 is a longitudinal vertical section taken in a plane about the center of the machine. Fig. 3 is a view, partly in section and partly in plan, showing part of the mechanism illustrated in Figs. 1 and 2. Fig. 4 is a horizontal section taken in the plane $x\,x$, Fig. 1, parts of the machine being removed. Fig. 5 is a transverse vertical section taken in the plane $y\,y$, Fig. 1. Fig. 6 is an end elevation taken from the forward end of the machine, the end inclosing plate being removed. Fig. 7 is an elevation of the entire machine, taken from the forward end. Fig. 8 is an elevation of the entire machine, taken from the rear end. Fig. 9 is a horizontal section taken in the plane $z$, Fig. 1. Fig. 10 is a horizontal section taken in the plane $x\,y$, Fig. 1. Fig. 11 is a view in detail of the mechanism illustrated in the lower portion of Fig. 6. Fig. 12 is a second view of the mechanism shown in Fig. 11, with the parts in a different position. Fig. 13 is a view of a detached part. Fig. 14 is a central vertical section of the nail-hopper, taken in the plane $x\,z$, Fig. 1. Fig. 15 is a central transverse section of Fig. 14, taken in the plane $x^4$. Fig. 16 is a transverse section of the nail-setting cylinder, taken in the plane $x'$, Fig. 2. Fig. 17 is a vertical section taken in about the plane $x^3$, Fig. 3. Fig. 18 is a plan view of a detached part. Fig. 19 is a view, in two positions, of the nails used in my machine.

The same letters of reference indicate like parts in all the figures.

In order to fully understand the nature of this invention, I must call attention to the peculiar construction or form of the metal nails used in my machine. These nails are cut perfectly headless, and the cut edges taper slightly, so as to give the nail a slight wedge shape upon those edges, while the two remaining sides are perfectly parallel to each other. The shape of the nail may be seen illustrated in Fig. 19, where I have shown it in two positions, $a$ being the nail with the flat surface turned toward the eye, showing the convergence of the cut edges, and $b$ showing the nail turned partly around to exhibit the parallel faces. These nails being absolutely without a head, or anything that answers the purpose of a head, the difficulty of handling them with certainty and precision by means of automatic mechanism is very greatly increased. In feeding and driving headed nails there is always something to support the head by, and all danger of its wedging or dropping out of its support is avoided. In the case of a headless nail, however, there is but one way in which the nail can be seized and so held as to be fed, and that is to support it by its wedging edges. The organization of mechanism for setting up a string of nails in this manner, for feeding, separating, and driving them, is a matter involving the gravest difficulties, and I am not aware of any instance in which these several results have been accomplished with practical success. In fact, the formation of a string or series of these nails, which is the very first step to be accomplished, has hitherto been regarded as a mechanical impossibility.

My invention consists in a certain novel construction and combination of parts for automatically handling and driving headless nails, which will first be clearly described, and then more specifically pointed out and defined in the claims.

The nails are placed in any suitable quantity in a cylindrical hopper, A, having rotary motion upon a shaft, $a$, mounted in bearings $a'$, which are bolted to the frame of the machine. The interior construction of this hopper is shown clearly in Figs. 14 and 15, and as it has an important bearing upon the manner of delivering the nails, I will describe it at this point. The cylindrical case A is closed at each end by a disk, B. A series of channels or grooves, 1 1 1 1, &c., are cut in the inner surface of the case A, said channels being parallel to the plane of rotation of the hopper and to each other. They occupy but little more than one-third of the inner surface of said case, and are arranged in the central portion thereof. Each channel is semi-elliptical in cross-section, so that a headless nail falling into it and sliding therein will be very apt to lie upon one of its cut edges.

Narrow slots 2 are cut in the case A, running transversely to the channels 1, said slots being a length equal to the space occupied by the channels. I have shown three of these slots or openings situated at equal distances apart; but this number may be increased or decreased according to the requirements of the work to be done by the machine. The channels 1 are gradually deepened on one side of the slots 2—viz., on the side on which the nail escapes—as shown at 3, Fig. 14. In the same figure, 4 is a check or stop bar (also shown in elevation in Fig. 15) having its end stepped, in order that it may be screwed to the case A by the ends 5 5, while the body of the bar lies in slot or opening 2 flush with the case, and having its rear edge lying against the side of the slot. The bar is knife-edged, and of such width that the sharp side lies opposite the deepened ends of the channels 1, a space being left between, as shown in Fig. 14. The deepening of these channels brings their open ends partly below and partly above the edge 6 of the bar 4. The purpose of this construction will be shown presently.

C are nail-distributing buckets attached to the shaft of the hopper, and having their concave faces toward the direction in which the hopper rotates. C' are similarly-shaped buckets attached to the hopper and alternating with the buckets C. The buckets C' are set in slots in the case A, a short distance behind each slot 2, and extend from one side of the case to the other.

D is a chute or trough leading to an opening, b, in one of the disks or heads B. The central part of the disk, to which this trough is attached, consists of a separate plate, B', united to the head of the hopper by a scarf-joint, d, and keyed at e, Fig. 15, to the journal-bearing a', so that it will remain stationary, the hopper turning upon said plate.

E indicates thin curved plates lying upon the outer surface of the case A, to which they are attached by set-screws c', passing through slots in the plate and into the case A. These plates are so placed that one edge impinges upon the opening 2 and upon the side opposite to the check-bar 4. By loosening the set-screws c' the plates E may be set up so as to partly close the slot 2, and thereby regulate the quantity of nails discharged therefrom.

The operation of this portion of my invention is as follows: A quantity of nails having been introduced through the opening b by means of the feeding-trough D, a slow rotary motion is given the hopper in the direction of the arrows in Fig. 14. The nails are thereby kept in constant agitation, being carried up by the buckets C' on the case A, whence they fall upon the buckets C on the shaft and slide therefrom to the lower portion of the cylindrical case, being prevented from falling into the opening 2 by the bucket C, which is placed just behind said opening. As the hopper turns farther the nails begin to slide in the grooves or channels 1 toward the next opening. Owing to the peculiar form of these grooves, the nails, as soon as they begin sliding therein, tend to turn upon their cut or narrow edges. As they approach the discharge-opening 2 the nails which slide point foremost will pass under the check-bar 4 and be discharged, there being ample space between the edge of said bar and the deepened ends 3 of the channels 1 to allow their passage. Those nails, however, which reach the opening 2 with the heads foremost and sliding upon their edges will, for the most part, strike against the edge 6 of the nail-check 4, and not only be prevented from escaping, but will be thrown over, as the hopper turns, into the channels 1 upon the other side of the discharge-opening 2, and will lie in those channels with their points toward the next succeeding opening, through which they will be discharged. The buckets C' are cut away directly over the channels, as seen in Fig. 15, so that nails which lie in said channels may slide beneath the edge of the bucket, while those lying outside or standing on end or piled across the channels will be carried up by the bucket and redistributed. The hopper A derives its motion from a gear, 7, Figs. 1 and 8, keyed to its shaft a, and driven by a pinion, 8, through a train of gearing from the main shaft.

F is a chute bolted to a projecting portion of the frame of the machine, and arranged directly underneath the central portion of the hopper A, as seen in elevation in Fig. 1. The form of this chute is shown in Figs. 7 and 8, where it is seen curved beneath and lying close to the hopper A, from the lowest point of which it descends by a gentle inclination toward the setting-cylinder G, the lower end of said chute being slightly curved downward, for a purpose to be described. Guard-flanges f are screwed to the sides of the chute, and its surface is grooved or channeled in precisely the same manner as the inner face of the hopper A. These channels in the chute may be seen at 10, Fig. 1. They correspond in form with those already described in connection with the hopper, and are so located by the position of the chute beneath the hopper that a nail sliding from one of the grooves 1 in the hopper A may pass directly into a corresponding channel in the chute, in which it may still slide on its cut edge to the lower end of the chute.

I will now turn to Figs. 2, 3, and 16 of the drawings, Fig. 2 being a vertical longitudinal section, Fig. 3 a plan view of the raceway with certain parts (hereinafter described) in section, and Fig. 16 a transverse section of the nail-setting cylinder G, the construction and operation of which I am about to describe, as in the operation of this machine this element is the next in order. This nail-setting cylinder G is placed at the rear end of the machine, and, as shown in Figs. 1 and 7, it is directly under the lower end of the chute F, which meets the cylinder a little to the right of a line drawn vertically through its center. Said cylinder consists of an open barrel-head having its axis horizontal. Equidistant slots 12 are cut in the forward end of the cylinder, each slot being within a plane radiating from the axis of the cylinder, as seen in Fig. 16, and being also exactly parallel with said axis. In this manner the open or forward end of the cylinder is divided into a certain number of parts, 13, the number of the slots in the present instance being fourteen, as shown in Fig. 2. These slots are cut well into the barrel-head, to admit a thin slide-plate or follower, 14, in each slot. The cylinder G, with its attachments, is mounted in a collar, H, which is rigidly bolted to angle-blocks 15, which are secured to the frame of the machine.

I is a ratchet slipped on said cylinder G in front of the collar H, and secured by being bolted or keyed to the cylinder, or even shrunk thereon. The cylinder receives intermittent or step-by-step motion from a three-armed dog, K, mounted on a shaft, 16, which is turned by a gear, 17, the latter receiving motion from a small pinion, 18, in the direction shown by the arrows in Figs. 7 and 8.

In each of the slots 12 in the cylinder G is placed a thin slide-plate or follower, 14. That portion of the plate which lies directly between the walls of the slot is thinner than the remaining portion, as shown in Fig. 16. That portion of said plate which lies above the slot 12 and outside the cylinder is in the form of a round solid bar or rod, 19. As shown in Fig. 16 and partly in Fig. 2, the slots 12 in the cylinder G have their upper edges beveled off slightly, and the lower part of the bar 19 on the slide-plate 14 rests in the beveled top of the slot. Beneath the ratchet I and in the inner surface of the cylinder are formed depressions 20, as shown in Fig. 2, to permit the slide-plate 14 to move, and also to provide space for a spiral spring, 21, which coils around the bar 19 and holds the slide-plate 14, when not acted upon by other mechanism, in the position shown in Fig. 2, (at the lower side of the cylinder G.) A metal ring, 22, surrounds the cylinder just in front of the ratchet I, apertures being formed in said ring to permit the passage of the cylindrical bar 19, whereby the slide 14 is steadied and guided. The ring 22 is shown in Figs. 2 and 8, and in the latter figure is seen the cylindrical apertures for the bars 19 of the slide-plates 14. A bar, 23, crosses the slot and passes through the slot in the slide-plate, limiting its motion in both directions.

The slide-plate 14 is actuated by a dog, 24, mounted upon a miter-gear, L, having its axis at right angles to the axis of the cylinder G, the shaft of said miter-gear being set in a half-bearing, 25, which is bolted to the rear end of the frame of the machine, as seen in Fig. 16. The miter-gear L is driven by a pinion, M, on a shaft, 26, said shaft being driven by a gear, 27, Fig. 8, meshing with a gear, 28, on the main shaft. As the latter rotates motion is given to the shaft 26 in the direction shown by the arrows in Fig. 8. Motion being thereby given to the miter-gear L, the dog 24 is slowly swept around in a circle, and as it rises the end of the dog 24 strikes a pin, 29, on the slide-plate 14 and moves said slide-plate from the rear end to the open end of the slots 12 in the cylinder. By this movement the spiral spring 21 is compressed, and as soon as the dog has moved far enough to pass below and out of engagement with the pin 29 the spring throws the plate back into the first position.

I have already mentioned that the nail-setting cylinder is driven by a three-armed dog, K. (Shown in Figs. 7 and 8.) The rotation of its shaft is so timed that the dog K engages with the ratchet I soon after the dog 24 has released the slide-plate 14. The distance through which the dog K moves the cylinder is just equal to the space between the slots 12 in said cylinder, so that when the dog 24 again rises it engages with the slide-plate next succeeding the one previously acted upon, the nail-setting cylinder remaining stationary while the slide-plate is thrown forward and until the next succeeding arm on dog K comes into engagement with the ratchet I on the cylinder.

Immediately in front of the cylinder G are placed two flat plates, N and O, having their ends abutting closely upon the edge of the nail-setting cylinder. (See Figs. 1, 2, 3.) These plates are separated by a space exactly equal to the width of the slots 12 formed in the cylinder G, as already described. When the cylinder is rotated by the dog K one of said slots 12 is brought into position shown in Fig. 3, where it exactly registers with the space or opening 30 between the plates N O, said space forming a raceway, which is virtually a continuation of the slot 12 in the cylinder. At the instant the cylinder is brought into this position the dog K leaves its ratchet, and it remains stationary until the dog 24 on the miter-gear L has shot the follower-plate 14 forward and released it. When the parts are in the position shown in said Fig. 3 the lower end of the chute F will be over the second slot to the right in said cylinder.

My invention will be more easily understood if the description of its parts be made to follow the order of the operation, and especially if said description be accompanied by a statement of the function of each element in its natural order of succession. I have already described the hopper A and shown how the nails are delivered from it, being caused to slide end foremost in the channels 1. I have also shown that as a rule only those nails will escape from the discharge-openings 2 which slide toward the opening with their points foremost. I will now describe in this connection the manner in which I set up a continuous string of nails, this being the first and one of the most important steps accomplished by my machine.

As the nails escape from the openings 2 in the hopper A they fall into the chute F, which has channels 10, already described as similar in form to those in the hopper. By this construction of the channels the nails are, for the most part, caused to turn upon their edges as they slide in said channels, and as they move toward the lower end of the chute F by far the greater number will present their wedging sides toward the walls of the slot 12 in cylinder G, which lies just beneath the lower end of the said chute. The slots in the nail-setting cylinder are all of such width that nails entering them "wedging" will be held therein with a little less than the upper half of the nail projecting above, while nails which enter with their parallel sides against the walls of the slot will fall through. On an average, from three to five nails will be caught by each slot. As the cylinder G rotates each slot 12 is brought in succession to register with the raceway 30 in the manner shown in Fig. 3. Being left in this position for a moment, the slide-plate 14 is driven forward, (shown in Figs. 2 and 3 as partly advanced,) and all the nails caught by said slot are forced into the raceway 30 between the plates N O. As the several slots in the rotating cylinder G arrive in line with the raceway 30 and discharge their nails a continuous string or form of nails is set up in the said raceway, those in front being pushed forward by those behind, until the raceway 30 is filled with nails from end to end. Those nails which are not caught by the slots either pass through them or fall into openings 31 in the cylinder-walls, and are caught by a box placed beneath the machine. In order to prevent the waste nails from falling into the gearing, a shield, P, is inserted within the end of the cylinder G, and as this shield necessarily has a slot, 32, to permit the movement of the dog 24, a second curved shield, 33, lies directly above the gear m, and is inclined sufficiently to throw any nails that drop through out of all contact with the gears. In order to prevent an accumulation of nails within the cylindrical shield P, an opening, 34, is formed at the lower part, through which the nails will drop. Just below this opening is an inclined trough, 35, attached to a flange, 36, on the inner end of the shield P. The trough 35 inclines downward and projects a little beyond the edge of cylinder G, so that the nails falling within the cylindrical shield will be caught by said trough and carried out of the cylinder.

As the nails pass into the raceway 30, and as the follower-plates 14 are successively thrown forward, pushing additional nails into the raceway, there is some danger of their wedging in the opening between the plates N O, owing to their peculiar wedging shape. In order to obviate this, I arrange between the plates, and in the same vertical plane with the raceway 30, an agitator or lifter, R. (See Figs. 1 and 2.) This consists of a long thick metal plate extending from the nail-setting cylinder G to the forward end of the plates N O, the upper edge being sloped throughout a portion of its length to correspond with the inclined portion of the raceway 30, as shown in Figs. 1 and 2. I will remark here that this inclination of the plates N and O is a matter of convenience and not of necessity, and is adopted merely to provide space in front of the incline for the gearing, and to enable the latter to be operated from a single main shaft.

The lifter R is mounted upon an angle-bar, 37, which is bolted to the floor of the machine, said angle-bar also furnishing a support for the ends of the plates N O, as seen in Fig. 1. A vertical slot is formed in said angle-bar, and the opposite wall of said slot is channeled, as shown at 38 in Fig. 2, and still better in Fig. 18. A flange or pin, 39, on the lifter R runs in each of these channels and supports and guides the lifter. It is operated by a shaft, 40, which is a continuation of the shaft 26, carrying the pinion m. (See Figs. 2 and 16.) The shaft 40 has a forward bearing, 41, in the angle-bar 37, and upon the end projecting is mounted a cam, S, which rests against a bearing-block, 42, attached to and projecting laterally from the lifter R. The latter is wholly supported by the shaft 40, and as the shaft rotates the "throw" of the cam S raises the lifter vertically about from three-sixteenths to one-fourth of an inch at each revolution. This movement brings the serrated upper edge of the lifter into contact with the points of the nails as they hang in the raceway and lifts the whole string of nails slightly, thereby relieving the nails, or any one of them, from any tendency to bind in the raceway as they pass forward. If desired, a prolongation, 43, (see Fig. 2,) may be formed to extend as far as into the open end of the slot 12 in the nail-setting cylinder. The bearing-block 42 is attached to the lifter by a flat yoke, 44, which is bolted to the opposite side of the lifter from the cam. The attaching-bolts pass through slots in the ends of the yoke, whereby the latter may be vertically adjusted and the lifter be set nearer to or farther from the plates N O. The angle-bar 37 also furnishes a support for the cylindrical shield P.

Having now formed a continuous string of nails in the raceway 30, it becomes necessary to provide some means of feeding them toward the forward end of the machine. The action of the follower-plates 14 cannot be depended upon to accomplish this purpose, their operation being intermittent, and the throw of the plates being too great for a feed, which should be more constant and of less action. Moreover, if the follower-plates were to be used exclusively, there would be danger, in case of any resistance being met, of the string bursting and flying upward out of the raceway. To give the required feed, therefore, I use two separate devices. The first and most essential is a pair of fingers or griper-bars lying directly beneath the plates N O, and arranged in such manner that the lower portion of the nails hanging in the raceway passes between the two bars. In the plan view, Fig. 3, these bars may be seen at T, shown in broken lines beneath the plates N O. They extend from the forward end of said plates to about the middle point thereof, and are mounted upon carriers T', to which they are connected by stud-pins 45, screwed into the carrier-plates T', the griper-bars T being so mounted upon said studs that they may have a slight motion toward and from the carriers. Between the two—viz., between the gripers and the carriers—are placed strong springs 46, by which the griper-bars T are, when not otherwise actuated, held against the heads of the stud-pins 45 and at their farthest limit of motion from the carriers T'.

Each carrier-plate T' is provided with two cams, 47, placed not far from the ends of the plate, as seen best in Fig. 4, where one of the raceway-plates N is removed to show the mechanism beneath, the same arrangement being also indicated in Fig. 3 by broken lines. The cams on one carrier-plate both rotate in one direction, while those on the opposite plate rotate in the opposite direction, the result being to throw the griper-bars T toward each other, then move them a short distance forward, then separate them, and finally retract them to repeat the operation, thereby producing a forward movement to feed the nails and a receding or backward movement in a curved path away from the nails. As shown in Figs. 2 and 4, these gripers lie just beneath the plates N and O and above the lifter R. Their action upon the nails is obvious. Being timed to operate between the actions of the lifter, they seize the whole series of nails which lies between them and carry them forward in the raceway as far as the throw of the cam moves the gripers while they are holding the nails. The yielding of the springs 46 gives them an elastic bearing throughout their entire length, and in the event of any unusual resistance to their action which might be caused by the feed being too rapid for the consumption of the nails they will merely slide upon the nails without carrying them forward.

The cams 47 are actuated by shafts 48, set in pillar-bearings which extend between the plates N and O and the depending part A' of the frame of the machine, in which the upper ends of the shafts 48 have a bearing. These shafts 48 are rotated by gears 49, Fig. 9, which are driven from the main shaft 51 by a miter-gear, 52, which meshes with another miter-gear, 53, on the shaft 48 of one of the cams. Below this gear 53 is placed the pinion 49 belonging to that shaft which meshes with the pinion 49 upon the cam-shaft of the opposite griper, T. A large gear, 50, communicates the motion from the first cam-shaft to the second and forward pair of cams, as seen in Fig. 9. By meshing the gears of the opposite cams together the said cams are caused to throw in opposite directions, while by the single intermediate gear, 50, the cams on the same griper-bar are caused to throw in the same direction, and the required movements are obtained with the least mechanism possible.

The second feeding device is placed above the plates N and O, and resting upon them. It consists of a pair of disks having their edges corrugated or milled. These disks lie flat upon the surface of the plates N O, with their edges projecting very slightly beyond the sides of the raceway 30. One of said disks—viz., the one indicated by reference-number 55—is of much greater diameter than the other disk, 56, (see Fig. 5,) this difference, however, being merely for convenience in providing for the bearings of the shafts. The small disk 56 is on a shaft, 57, set in a drop-bearing, 58, attached to the part A' of the frame of the machine. The larger disk 55 is mounted on a short shaft, 59, set in a standing bearing, 60. I repeat that these disks might as well be of equal diameter; but merely for convenience of arranging them in suitable bearings and driving them with the least possible gearing, I have placed them as shown. Their difference in size or diameter is merely an incident of their location. Each disk is rigidly mounted on its shaft, and motion is imparted to both in the manner following:

On the shaft of the large gear 50, Figs. 1, 2, 5, 9, and 10, is mounted a pinion, 61, placed just beneath the large gear. This pinion meshes with an intermediate gear, 62, Figs. 9 and 10, which, in turn, meshes with a pinion on the end of the shaft 57, which carries the small disk 56. Motion is thereby given to said shaft and disk, and this motion is imparted to the shaft 59 which carries the large disk by means of a pinion, 63, placed about the middle of the shaft 57, and meshing with a pinion, 64, on the shaft 59 which carries the large disk. As the disks are not of equal diameter, the two gears 63 and 64 are also unequal, the former bearing the same proportion to the latter that the smaller disk bears to the larger. By this construction the surface-speed of the two disks is exactly equal. The rate of speed is so graduated that it is equal to the feed movement of the fingers or gripers T.

In order to prevent the disks from crushing nails of unequal size, and to give them an elastic hold upon the nails which pass between them, they are so constructed as to yield slightly against the pressure of a spring. The large disk 55 has the lower bearing of its shaft in a bearing-block, 65, (see Fig. 4,) having one end pivoted to the bolt 66 and the other end held by a stud-pin, 67, having a powerful spring, 68, coiled round it and bearing against the end of the bearing-block and against the fixed abutment-block 69. This allows the disk to yield sufficiently to any given pressure, and at the same time gives an elastic hold upon the nails. The small disk also has a yielding bearing, against which a strong curved spring, 70, presses (see Fig. 5) for a similar purpose.

In Fig. 13 I have shown a segmental cam, which I may, under certain circumstances, mount upon the plates which carry the finger-bars T. These segmental cams, however, are not essential, and as they form no part of the invention I now claim, no particular description is needed.

Having now followed the construction and operation of the machine through the several steps of setting up the nails, forming them into a continuous string, and passing them through a raceway in which they are supported, I now come to a step in the operation of the machine of considerable importance.

In order to drive the nails it is necessary to separate them, one at a time, from the string in which they stand and carry the separated nails singly into the throat of the machine, where they may be subjected to the action of the driver. The separation of the nails is effected after they reach the extreme forward end of the raceway 30. I accomplish it by taking the foremost nail in the string of nails standing in the raceway and carrying it a short distance to the left of the raceway, and there pushing it into the throat of the machine, where it lies directly over the shoe and just beneath the driver, which immediately descends and forces the nail home. I accomplish this by the following mechanism:

Referring to Fig. 2 of the drawings, (said figure being a vertical central section taken longitudinally of the machine,) V is a thin flat steel plate, arranged vertically and extending across the front of the machine in relation to the raceway-plates N O and bearing against the forward ends of said plates, as seen in Fig. 4. A horizontal section of this plate, with other parts, is also shown in Figs. 3 and 4, while it is partly seen in end elevation in Fig. 6 and fully shown in Figs. 11 and 12. By means hereinafter described it receives horizontal reciprocation, sliding upon a base-support, 72, on which the lower edge of the plate slides, as shown in Fig. 2. The arrangement of the reciprocating mechanism limits the movement of the plate to a distance of about five-eighths ($\frac{5}{8}$) of an inch. At about the central part of the plate I cut a slot, 73, passing completely through the plate, and of a size sufficient to allow the nails to enter and pass through in the position they occupy in the raceway 30, and as shown in Fig. 11. The walls of this slot are at right angles with the surface of the plate, and at about the center of the opening I cut a short transverse opening, 74, directly across the slot 73. The vertical walls of this transverse cut flare open on the side toward the raceway, as seen in Figs. 3 and 4. Now, when this plate V is reciprocated to the right of the machine, its limit of motion in that direction brings the slot or opening 73 exactly in line with the raceway 30, of which said slot may be said to form a continuation, it being so situated that the nails may be fed from the raceway directly into said slot in the plate, the nail, when it is placed therein, standing vertically and being wholly within the sliding plate V. The nails are introduced singly into the slot 73 in the manner following:

The gripers or finger-bars T, which close upon the nails in the raceway and then move forward, carrying the whole string of nails with them, have their forward ends beveled, as shown at t, Fig. 4, (also in broken lines in Fig. 3.) This bevel on the finger-bars corresponds with the flare of the transverse cut 74, (shown in said Figs. 3 and 4,) and the forward movement of the said finger-bars T is of such extent that their extremities, at each stroke of their actuating-cams, enter the cross-slot 74 with the foremost nail in the continuous string of nails clasped between said extremities. The movement of the bars is so timed and arranged that the moment they have carried a nail fairly within the slot 73 they begin to separate, releasing the nail lying in the slot, as well as the whole string of nails behind the foremost nail. All these nails, however, excepting the one left in the slot 73, hang in the raceway while the finger-bars move back to take a fresh hold upon the string. The foremost nail having been carried beyond the forward end of the raceway and left in the plate V, the latter is free to move while the finger-bars T are being retracted for a new forward feed movement. Said plate accordingly slides toward the left of the machine, carrying the nail left in the slot with it.

In Fig. 11 the plate V is shown in the first position, with the nail entering the slot from the raceway held between the ends of the fingers T. In Fig. 12 the plate is shown in the second position, having moved five-eighths ($\frac{5}{8}$) of an inch to the left. When in the latter position the slot 73, containing the nail, is directly over and in vertical line with the throat of the machine, into which the nail is to be discharged from the slot. This throat is seen at g, Figs. 11 and 12. It is a nearly cylindrical opening or passage formed in an end block, W, bolted to the end of the frame. In order to discharge nail from the slot 73 in the plate V, I employ a device (shown in Figs. 3 and 4) constructed and operating as follows:

A thin plate, f', is mounted upon a carrier-block, g', which lies upon one of the raceway-plates, the parts being so arranged that when the slotted plate V, carrying the nail, is moved to the left, bringing the nail over the throat g, the vertical edge of the plate f' shall be exactly opposite to the slot 73, in which the nail stands This position of the plate or punch f' is shown in Figs. 4 and 12, the vertical edge of the plate only being seen in the latter figure. Now, if the punch is thrown forward into the slot 73, the plate V being stationary meanwhile, it will push the nail out of the plate into the throat g, which lies in front of the slot 73, as shown in Fig. 4, and extends down below the plate V, as shown in Figs. 11 and 12. I will remark here that in the two figures last named one-half only of the throat is shown, the block or plate E', which contains the corresponding groove, being removed. This plate is shown attached, however, in Figs. 3 and 4, and the upper portion of the throat lying in front of the slot 73 may be distinctly seen. In Fig. 12 the vertical edge of the punch may be seen entering the slot 73, from which it has pushed the nail, the latter being shown at the bottom of the throat $g$, where its point rests on the shoe in position for the driver F' to descend and drive it home. In order to bring the edge of the punch $f'$ in position to enter the slot 73, the plate is set in a slot, $i'$, in the raceway-plate N, whereby said plate is brought upon a level where it can enter the slot and dislodge the nail.

The said plate $f'$ is operated in the following manner: The carrier-block $g'$, on which said plate is mounted, has a spring-box, $k'$, (see Fig. 3,) which slides in a casing, $l'$, which is bolted by a flange, $m'$, to the plate N. Within said box $k'$ lies a spiral spring, $n'$, which bears at the rear end against the end of the casing $l'$ and at the other end against the block $g'$. The tendency of this spring is to throw the plate $f'$ forward into the slot 73. Upon the top of this casing $l'$ is placed a lever, F', pivoted at one end, $o'$, and having between its extremities a stud-bolt, $i$, passing down through a slot, 75, in the casing $l'$, and connecting with the spring-box $k'$. The free end of the lever has a lip, 76, which bears against a segment-cam, G', which is mounted on the cam-shaft 49. This cam (see Fig. 4) is simply a disk with a segment cut off. It has rotation from right toward the left, and as long as the lever rests against its periphery outside of the removed segment the plate $f'$ will be held back, compressing the spring $k'$. As the shaft 49 revolves and the flat side 77 comes around the spiral spring throws the plate $f'$ forward into the slot 73, dislodging the nail in the manner already described.

I will now describe more fully the construction of those parts connected with the slotted separating-plate V and its actuating mechanism. This plate, as already remarked, slides laterally against the forward ends of the raceway-plates N and O. Directly in front of said plate V is placed a solid metal block, I', (see Figs. 3, 4, and 6,) the lower portion of which has a semi-cylindrical channel, forming half of the throat $g$. When this block is set in place against the plate V and the end block, W, (see Figs. 11 and 12,) the throat $g$ will consist of a vertical cylindrical aperture, half being in one block and half in the other. Directly above the throat, and leading to it, is a channel, 78, (see Figs. 3, 4, and 6,) to receive the nail as it leaves the plate and carry it to the throat. The sliding plate V is moved toward the left by a lever-arm, H', (see Fig. 5,) pivoted to a bracket, K', at a point near the center of said lever-arm. At its upper end it is connected by a forked joint to a horizontal bar, L', sliding in a socket in the frame of the machine. (See Fig. 2.) This bar is thrown to the right of the machine at each revolution of the main shaft by a dog, 79, (see Fig. 2,) which strikes an offset on the bar (shown in broken lines in Fig. 5) and carries it to the right until the dog leaves the shoulder on the bar. Just as it reaches this point the slotted plate V, which is moved by the action of said dog, has reached the throat $g$ and the ejector-plate $f'$ has moved forward, pushing the nail out of the slot. The plate $f'$ remains an instant in the slot while the flat face of the cam G' is passing the bearing end of the lever F'. Meantime the dog 79 has left the bar L', and the plate is therefore held entirely by the punch. The instant the latter is withdrawn the plate is retracted by a strong spiral spring, M', (see Fig. 6,) arranged in a chamber in the end block, I', and surrounding a rod, N'. (See also Fig. 2.) This rod passes through a lug, O', to which it is firmly secured. The spring M' abuts against said lug, and its force is sufficient to throw the plate back into position. A comparison of the position of the parts as shown in Figs. 6, 11, and 12 will clearly illustrate these points. In Fig. 6 the dog 79 has pushed the bar L' to the right until the slot 73 registers with the throat $g$. At this instant the punch-plate $f'$ enters the slot, as seen in Fig. 12, displacing the nail, and the dog 79 at the same moment leaves the shoulder on the bar L', and the whole stress of the spring M' is sustained by the end of the punch-plate. As soon as this is withdrawn the tension of said spring restores the parts to the position shown in Fig. 11, bringing the slot 73 again in line with the raceway, ready to receive another nail and repeat the operation.

Between the plate V and the solid end block, I', I place a small plate, P', Fig. 17, which is set in a space cut out of the block I', so that the surface of the plate P' shall be flush with the surface of the block. The plate is slotted at $p'$ $p'$ to allow it to have a certain sliding motion on the block I', the said slots receiving short pins $r'$ projecting from the block. On the end of the plate is an offset, $s'$, which limits the motion of the plate by striking against the end block, I'. A leaf-spring, $t'$, bears against the end of the plate, the other end of the spring being mounted on a block, $v'$. (See Figs. 6 and 17.) The movement of the plate when acted upon by the spring is just sufficient to bring its end into line with one wall of the channel in the solid end block, I', which leads to the throat $g$, as seen in said Fig. 17. The function and operation of this part is as follows: When the lever-arm H' draws the slotted plate V toward the right of the machine in order to bring the slot 73 opposite the raceway, the pressure of the spring $t'$ upon the plate P' is relieved as soon as the plate V has moved a short distance, as the spring $t'$ is carried by a block mounted on the plate V. As soon as this pressure is taken off the plate P' it begins to slide with the plate V, and when the slot 73 has arrived in line with the raceway 30 the solid face portion 80 lies directly behind (or, more correctly, in front of) said slot. Now, when the nail enters the slot it is supported in front of the plate V by the face portion 80 of the plate P'. As soon as the nail-separating plate V begins to move toward the left to bring the nail over the throat the plate P' begins to slide with it, and continues to move in company with and in front of said plate V until the offset s' on the plate P' strikes the end block, I'. The motion of this plate at once ceases; but the slotted plate V, carrying the nail, continues to move and carries the nail beyond the edge of the plate P' and over the throat, the elasticity of the spring t' permitting the plate V to move after the motion of plate P' is arrested. In Figs. 17 the parts are shown in this position, the plate P' having just been checked, while the slotted plate V behind it is just beginning to slide upon it to carry the slot 73 beyond the end of the plate P'. The object of this construction is to prevent the nail sliding against and over the plane surface of the end block, and to place in front of the nail-slot a wall of metal which shall slide with the slot, and at the same time not close the channel 78, which leads to the throat. The object of this is not only to avoid undue friction upon the end block, I', but also to prevent the sharp angles of the nail catching upon slight inequalities in the metal surface, upon which it would slide but for the plate P', and by which the position of the nail in the slot 73 might be seriously affected. While this element is not absolutely essential to the operation of the machine, I have found by experience that it is desirable to surround the nail, while it lies in the separator-plate V, as far as possible, with solid metal walls moving with the nail. Fig. 17 is a vertical section taken on a plane coincident with the forward surface of the plate P'. The plate V is shown behind it moving toward the left, and the slot 73, which carries the nail to the throat, is shown in broken lines impinging upon the channel 78, leading to the throat g.

The nail-driver consists of a straight cylindrical rod of steel, $a^2$, carried by a plunger, $B^2$, sliding vertically in the forward end frame of the machine, the driver being held in said plunger by a gripe-nut bearing against its inner face, and slotted, the construction being similar to the method adopted for fastening sewing-machine needles in the end of the needle-arm. This plunger is raised by a cam, $C^2$, on the main shaft bearing against a friction-wheel, $D^2$, journaled at one end of its shaft in the body of the plunger-bar and at the other end in a drop-bearing, $b^2$, on the plunger-bar. By this construction I get a bearing at each end of the shaft and avoid all possibility of the cam-pin breaking, as is often the case when the pin has a bearing at one end only. The driver is thrown down with sufficient power to drive the nail by a strong spiral spring, $E^2$, contained within a spiral casing, $F^2$, placed upon the top of the frame, directly over the plunger $B^2$. A prolongation, $G^2$, of the plunger $B^2$ passes upward into the casing F and engages with the spiral spring $E^2$, which is compressed when the driver is raised by the cam $C^2$.

In the operation of this machine it seldom happens that the nails enter the nail-setting cylinder in any way except with their points foremost. Occasionally, however, one will fall into a slot below by dropping through the openings in the parts 13, and will stick in the slot with its point projecting on the outside of the cylinder. If this nail should be brought opposite the raceway and driven into it, there might be danger of its wedging among the other nails and making trouble. I have therefore provided a device for clearing the slots 12 of nails which enter them in such position. To a projection, 81, upon the under side of the chute F, I bolt a strong elastic steel plate, 82, having a block, 83, which rests against the outer face of the cylinder 11 and extends from end to end of the slots 12, the location of the block 83 being such that when the cylinder stops upon the dog K, leaving the ratchet I, the said block will exactly cover one of the slots 12. A tooth or offset formed in the edge of the plate 82 rests upon the ratchet I, and at each forward movement of the cylinder a tooth of the ratchet pushes the plate 82 outward, drawing the block 83 away from the cylinder. Just as the rotation ceases the said tooth passes the offset on the steel plate 82 and the block 83 snaps suddenly against the cylinder, directly over one of the slots, dislodging all the nails which are fallen into and sticking out of said slot, in the manner described, and driving them into the interior of the cylinder against the shield P. In this manner the slots are kept entirely clear. The block 83 can only act upon nails which enter the slots in the manner set forth, since the cylinder takes nails from the chute F beyond the point on which the block operates, and all nails so taken are driven into the raceway by the slide-plates 14. It is only those nails which enter the slots from the interior of the cylinder, and consequently have their points projecting outside, that will be removed by this clearer 83.

In nailing, the edge of the shoe-sole rests against an adjustable gage, $I^2$, Fig. 2, and is fed by a feed-foot, 84, pivoted to a bracket upon the front end of the machine, the pivoted point being at 85, between the two ends of the feed-foot bar. The upper end of the said bar is vibrated by a cam, 86, and the feed movement may be graduated by moving the pivot-bolt 85 up or down, and thereby shortening or lengthening the acting distance. The construction of these parts, as shown in Figs. 1 and 7, is too obvious to require description. The actuating-cam 86 is driven from the main shaft through an intermediate gear, 87. (Shown in Fig. 5.)

Having thus fully described my invention, what I claim as new, and desire to secure by Letters Patent of the United States, is—

1. In a machine for driving headless nails, a revolving hopper channeled within to deliver the nails end foremost, and provided with discharge-openings and distributing-buckets, substantially as and for the purpose set forth.

2. In a machine for driving headless nails, the combination, with a revolving channeled hopper having discharge-openings, as set forth, of nail-check bars, constructed as described and placed in said openings to arrest all nails sliding toward the opening head foremost, substantially as and for the purpose set forth.

3. In a machine for driving headless nails, a revolving nail-setting cylinder having slots cut therein at regular intervals, in the manner shown, in combination with follower-plates adapted to move in said slots to discharge therefrom the nails caught by said slots, substantially as and for the purpose set forth.

4. In a machine for driving headless nails, the combination, with a revolving nail-setting cylinder having open-end slots of the form shown, of plates forming a raceway, with which said slots successively register, and follower-plates moving in the slots to drive the nails therefrom into the raceway, substantially as and for the purpose set forth.

5. In a machine for driving headless nails, the combination, with the raceway-plates, between which the nails are set up in a continuous string, of a lifter placed beneath said raceway and adapted to rise at set intervals to lift the nails hanging in the race and prevent them from wedging therein, said lifter being actuated by a cam, and having an adjustable bearing-block, whereby it may be set at different distances from the raceway, as set forth.

6. The combination, in a machine for driving headless nails, of plates forming a raceway for supporting a continuous string of nails, a lifter to agitate said nails, and griper-bars moving upon the under surfaces of the raceway-plates, said gripers being adapted to grasp the forward portion of the continuous string, carry it forward in the raceway, and release it, their movement being timed between the movements of the lifter, substantially as set forth.

7. The combination, in a machine for driving headless nails, of plates forming a raceway for carrying a continuous string of nails, a lifter to agitate said nails, and feeding-disks rotating against opposite sides of the string, in the manner set forth.

8. The combination, in a machine for driving headless nails, with the griper-bars for advancing the string in the raceway, of carrier-plates upon which said gripers are mounted, with elastic bearings between to give said gripers a yielding contact with the string, for the purpose set forth, the carrier-plates being driven by cams, substantially in the manner and for the purpose set forth.

9. The combination, in a machine for driving headless nails, with the nail-separating plate, of an ejector adapted to enter the nail-slot after the nail has been brought over the throat and push it from said slot into a channel leading to the throat, substantially as and for the purpose set forth.

10. The combination, in a machine for driving headless nails, with the nail-separating plate and the end block in front of it, of a sliding plate set in said end block and adapted to move with the separator-plate and cover the nail-slot until said slot is adjacent to the channel leading to the throat, substantially as and for the purpose set forth.

11. The combination, with a revolving hopper, a chute leading therefrom, a revolving nail-setting cylinder at the lower end of said chute, having slots to receive the nails delivered by said chute, of plates forming a raceway, with which said slots successively register, and suitable mechanism to drive the nails from the slots into the raceway to form a continuous string of nails, all substantially as and for the purpose described.

12. The combination, in a machine for driving headless nails, of plates forming a raceway to carry a continuous string of nails, griper-bars beneath said race to carry said nails forward therein, a lifter to ease the nails in the race between the feed of the gripers, and revolving disks above the raceway bearing against the opposite sides of the web to aid in advancing the nails, substantially as and for the purpose described.

13. The combination, with the plates forming a raceway for carrying a continuous string of headless nails, of the griper-bars having extremities projecting at each forward throw of their cams beyond the open end of the race, a separator-plate having a slot adapted to receive the foremost nail in the string, said slot being formed, as described, so that the gripers may enter it carrying a nail, may release said nail and be retracted, leaving it within the slot in the plate, the remaining nails being held by the raceway, substantially as and for the purpose described.

14. The combination, in a machine for driving headless nails, with the revolving nail-setting cylinder, of a spring-actuated clearer-block adapted to be raised at each forward movement of said cylinder, and as the movement ceases to snap against it over one of the slots in said cylinder, thereby ejecting all the nails lodged in said slot in improper position, substantially as and for the purpose described.

15. The combination, with the revolving nail-setting cylinder, of the cylindrical shield P, having the bottom opening, 34, and flange 36, and the inclined trough attached to said flange beneath the bottom opening, substantially as described.

16. The combination, with the revolving nail-setting cylinder having ratchet I, of follower-plates 14, springs 21, dog 24, and dog K, all substantially as and for the purpose described.

17. The combination, with the raceway-plates N O, of the lifter actuated by a cam, 5, the finger-bars T, carrier-plates T', springs 46, and cams 47, substantially as and for the purpose described.

18. The combination, with the raceway-plates N O, adapted to carry a continuous string of nails, of the disks 55 and 56, having their bearings in a yielding support, substantially as and for the purpose described.

19. The combination, with the separator-plate having a nail-slot, 73, of the ejector f', spring n', lever F, and segment-cam G', substantially as and for the purpose described.

20. The combination, with the separator-plate having a nail-slot, as set forth, of the lever-arm H' and spring M', substantially as and for the purpose set forth.

21. The combination, with the separator-plate V, having nail-slot, as set forth, of the lever-arm H', spring M', and ejector f', actuated by the lever F' and segment-cam G', all substantially as and for the purpose described.

22. The combination, with the separator-plate V, having a nail-slot, as set forth, of the end block, I', having channel 78, leading to the throat, the plate P', and spring t', substantially as and for the purpose set forth.

23. A nail-hopper having distributing-buckets C C', channels 1, discharge-openings 2, and nail-check bars 4, substantially as and for the purpose described.

24. The combination, with the nail-hopper, of a head, B', keyed to the journal-bearing and adapted to slide upon the end of the hopper, and a feeding-chute, D, substantially as and for the purpose described.

25. The combination, with the hopper A, of adjustable plates E and set-screws e', passing through slots in said plates, substantially as and for the purpose set forth.

In testimony whereof I have signed my name to this specification in the presence of two subscribing witnesses.

SAMUEL SHEPHERD.

Witnesses:
   L. L. TILDEN,
   C. B. TILDEN.